(12) United States Patent
Getzinger et al.

(10) Patent No.: US 7,558,801 B2
(45) Date of Patent: Jul. 7, 2009

(54) DISTRIBUTING LIMITED STORAGE AMONG A COLLECTION OF MEDIA OBJECTS

(76) Inventors: Thomas W. Getzinger, 8715 141$^{st}$ Ct. NE., Redmond, WA (US) 98052;
Henrique S. Malvar, 2302 233$^{rd}$ Ave. NE., Sammamish, WA (US) 98074

( * ) Notice: Subject to any disclaimer, the term of this patent is extended or adjusted under 35 U.S.C. 154(b) by 356 days.

(21) Appl. No.: 11/149,037

(22) Filed: Jun. 8, 2005

(65) Prior Publication Data
US 2005/0226514 A1 Oct. 13, 2005

Related U.S. Application Data

(63) Continuation of application No. 10/099,807, filed on Mar. 14, 2002, now Pat. No. 6,976,026.

(51) Int. Cl.
*G06F 17/00* (2006.01)
(52) U.S. Cl. .............. 707/101; 707/100; 707/104.1; 707/200; 382/232; 382/244; 382/250
(58) Field of Classification Search ............ 707/101, 707/100, 104.1, 200; 382/166, 232, 244, 382/250
See application file for complete search history.

(56) References Cited

U.S. PATENT DOCUMENTS

| | | | |
|---|---|---|---|
| 5,892,847 A | 4/1999 | Johnson | |
| 5,974,182 A | 10/1999 | Bryniarski et al. | 382/232 |
| 6,195,462 B1 | 2/2001 | Bryniarski et al. | 382/239 |
| 6,349,151 B1 * | 2/2002 | Jones et al. | 382/251 |
| 6,553,150 B1 | 4/2003 | Wee et al. | 382/243 |
| 6,832,006 B2 | 12/2004 | Savakis et al. | |
| 2001/0054131 A1 | 12/2001 | Alvarez et al. | 711/105 |
| 2002/0032027 A1 | 3/2002 | Kirani et al. | 455/426 |
| 2002/0069218 A1 | 6/2002 | Sull et al. | 707/501.1 |
| 2002/0089519 A1 | 7/2002 | Betz et al. | 345/634 |

OTHER PUBLICATIONS

Arcangelo, Bruna, and Mancuso Massimo. 2001. JPEG Compression Factor Control: A New Algorithm. *IEEE* 206-207.
Boliek, Martin, Ed. Dec. 7, 2000. JPEG 2000 Part II Final Committee Draft. Annex M "JPX file format extended metadata definition and syntax." *ISO/IEC FCD15444-2*: 227-233 and 262-266.

(Continued)

*Primary Examiner*—Hung Q Pham
(74) *Attorney, Agent, or Firm*—Turocy & Watson, LLP

(57) ABSTRACT

A quality level determining the extent to which each image file is compressed is automatically computed for each image file in a set to ensure that the total size of the compressed image files does not exceed a predefined limit. The compressed size of each image file is initially determined when compressed at a predefined minimum acceptable level and at a nominal level. The relative complexity of the image files is determined based upon their high frequency energy content. As a function of the image file complexity, and starting with the compressed sizes initially determined, the appropriate quality level is determined for compressing each of the image files in an iterative process that ensures the total size of the compressed image files does not exceed the predefined limit, while retaining acceptable quality. Thus, a set of image files can be compressed optimally to fit within a limited storage.

20 Claims, 8 Drawing Sheets

OTHER PUBLICATIONS

"iPhoto FAQ." in Apple Website: http://www.apple.com/iphoto/faq.html, 3 pp.

Kim, Wook Joong, Jong Won Yi, and Seong Dae Kim. 1999. A Bit Allocation Method Based on Picture Activity for Still Image Coding. *IEEE* 974-977.

Supangkat, Suhono Harso, and Keinosuke Murakami. 1994. Quantity Control for JPEG Image Data Compression Using Fuzzy Logic Algorithm. *IEEE* 144-145.

* cited by examiner

DISTRIBUTING LIMITED STORAGE AMONG A COLLECTION OF MEDIA OBJECTS

RELATED APPLICATION

This application is a continuation of a copending patent application, Ser. No. 10/099,807, filed on Mar. 14, 2002, the benefit of the filing date of which is hereby claimed under 35 U.S.C. § 120.

FIELD OF THE INVENTION

This invention generally pertains to controlling the size of a plurality of data files that must fit in a limited storage, and more specifically, for selecting a quality parameter that determines the size of each data file so that the total size of the plurality of data files is no greater than a predetermined limit.

BACKGROUND OF THE INVENTION

There are many occasions when it is necessary to copy a collection of image files onto a floppy disk or send a collection of image files as an attachment to an email message. However, given the transmission time and permissible email attachment size, it may be necessary to limit the total size of the attachment. Similarly, if the file size (in bytes) of each of the original image files in the collection is relatively large, it will often not be possible to fit all of the images in the collection onto a conventional 1.44 MB floppy disk, particularly, since other files may be stored on the floppy disk using some of the available storage. Typically, a person might decide to address these limitations by reducing the number of images that are saved onto a floppy or that will be sent as the email attachment so that the total bytes of the image files will be equal or less than the available storage size on the disk, or sufficiently small to be acceptable as an attachment to an email message.

Another approach that is often employed in addressing this problem is to save each of the images in a compressed file format so that the total size (in bytes) of the compressed images in the collection will fit in the available storage on the floppy disk or be sufficiently small to transmit as an email attachment. While there are other compression standards, one of the more popular compression formats for saving images employs the Joint Photographic Experts Group (JPEG) standard. The file sizes of images compressed using the JPEG standard can be substantially smaller than that of the original decompressed images, but there is a slight disadvantage in using this compression scheme. The JPEG standard employs a "lossy" type of compression, so there is always a loss of some of the data that was in the original decompressed image when the compression scheme is applied and the compressed file is subsequently decompressed for viewing. The lost data cannot be recovered from the compressed image.

The amount of image data that is lost and thus, the quality of the image that is displayable after decompressing the compressed image data is determined by a quality level. The quality level determines the amount of compression applied to the original data in producing the compressed data file. Theoretically, the quality level can range between a minimum quality level of "0" and a maximum quality level of "100," where a higher quality decompressed image is achieved by reducing the amount of compression that is applied to the image file. However, as a practical matter, it is generally agreed by those skilled in the art that an acceptable compression range can be obtained using a quality level between 5 and 95. If a quality level below 5 is used to compress an image, the appearance of the image after it is subsequently decompressed will often be of too low quality to be usable, while if the quality level is set above 95, the amount of compression (or file size reduction) that is achieved will be too little to justify the use of the compression scheme.

Images can differ substantially in regard to their complexity. An image that consists mostly of large areas having minimal color and contrast variation is much less complex than an image with lots of detail and variation in color and contrast. For example, an image of a uniform color, cloudless sky is much less complex than an image of a maple tree covered with thousands of brightly colored autumn leaves. An image with less complexity can be compressed to a much larger extent than an image of greater complexity, while retaining about the same perceived quality after being decompressed.

Typically, to fit a group of compressed files into a specified storage, the same quality level will be used in compressing each of the image files in the group. However, the results will often be disappointing, since more complex images will lose too much detail and appear unacceptable when subsequently decompressed and displayed. Less complex images will typically be compressed less than they might be and still retain an acceptable quality when decompressed. It would therefore be preferable to employ a higher quality level when compressing images that are more complex and a lower quality level when compressing images that are of lower complexity. Yet, the size of a compressed image file will not be evident until the compression scheme has actually been applied. Consequently, it will be unduly burdensome to manually test different quality levels for use in compressing each image in a collections to arrive at a mix different optimal quality levels that should be applied to ensure that all of the compressed image files in the set will fit on a floppy disk, or be sufficiently small to send as an email attachment. Clearly, it would be desirable to provide a program that can automatically determine an acceptable near optimal quality level that should be used in compressing each image file in a set, so that the total size of the resulting compressed image files is within some specified limit. The program should determine the quality level and thus, the corresponding degree of compression applied to each image in the set, based upon the complexity of the images.

SUMMARY OF THE INVENTION

The present invention is directed to a method for automatically determining the compression level that will be applied in compressing files to fit within a limited storage or so that the total compressed file size is less than a predefined limit. While not limited to compressing image files, the method is thus applicable in determining how to most effectively compress a set of image files to fit within an available storage capacity of a medium such as a floppy disk. In this method, a quality level is automatically determined for compressing each file to produce a compressed file, so that a total size of the compressed files does not exceed the predefined limit.

This method can perhaps be most readily understood in connection with compressing a set of image files. Initially, each image file in the set is processed to determine a compressed file size when compressed to a predefined minimum quality level. In this regard, it should be noted that the greater the degree of compression, the lower the quality of the image that can be displayed when the compressed file is decompressed. Ideally, the compression that is applied to each file should be selected based upon the complexity of the file, while ensuring that the total size of the compressed files does not exceed the predefined limit. Initially, a nominal compressed file size is also determined for each file when compressed to a nominal quality level. In addition, a weight is determined for each image file based upon a high frequency energy content of the image file, which is related to the complexity of the image file. An image file that is more complex will have a greater high frequency energy content and thus, a greater weight than a relatively simple image file. Image files that are suitable to be compressed with the predefined minimum acceptable quality level are then identified as a function of the compressed file size of the image files when compressed to the predefined minimum acceptable quality level and as a function of the weight of the image files.

For the other image files of the set that will not be compressed with the predefined minimum quality level, it is necessary to determine an optimal quality level for use in compressing the files. The appropriate quality level is determined so that each of these other image files will be compressed to a desired size that is selected as a function of the weight of the image file, but so that the total size of all of the compressed image files will not exceed the predefined limit. The images files identified as suitable to be compressed to the predefined minimum acceptable quality and the other image files that are to be compressed with the quality levels that were determined for each of them are then compressed at these respective quality levels.

For a given type of compression, there is typically a preferable range of quality levels that should be used. If JPEG compression is employed, the range of quality levels that is generally considered acceptable is from about 5 to about 95, on a scale ranging from 0 through 100. It is thus preferable to limit the quality level that is used in compressing the image files to a predetermined range that extends from the predefined minimum acceptable quality level, e.g., 5, to a substantially higher maximum acceptable quality level, such as 95.

A scaling factor is also determined based upon the space remaining for compressed files relative to the predefined limit, and upon a total weight of all of the image files not being compressed to the predefined minimum acceptable quality level. Indeed, the step of identifying image files that will be compressed with the predefined minimum acceptable quality level is repeated in successive passes through the set of images files, until a pass through the image files is completed without identifying any additional image file to be compressed at the predefined minimum acceptable quality level.

To determine the quality level that will be used, for compressing the other image files, a desired size of the compressed image file is computed for each file. The desired size is preferably determined as a function of the weight of the image file. The method then calls for determining an optimal quality level to apply to each image file to achieve the desired size when the image file is compressed. The difference between the desired size and an actual size of the image file when it is compressed to the optimal quality level is also computed.

In determining the optimal quality level, the method starts with the nominal quality level and determines if the nominal compressed file size is less than the desired size by no more than a predefined difference, and if so, assigns the nominal quality level as the optimal quality level. If not, the method reduces the range from which a new quality level to try is selected. The new quality level that is selected in this narrower range is determined using a model that relates the image quality to the compressed file size. If the compressed file size resulting from compressing the image file using the new quality level is less than the desired size by no more than the predefined difference, the new quality level is assigned as the optimal quality level. If not, the preceding two steps are repeated with successive new quality levels, until the optimal quality level is determined.

Another aspect of the present invention is directed to a memory medium on which are stored machine instructions for carrying out the steps of the method. Yet another aspect is directed to a system that includes a memory in which machine instructions are stored, and a processor that executes the machine instructions, causing the processor to carry out functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Computing Environment for Implementing the Present Invention

Figure 1:
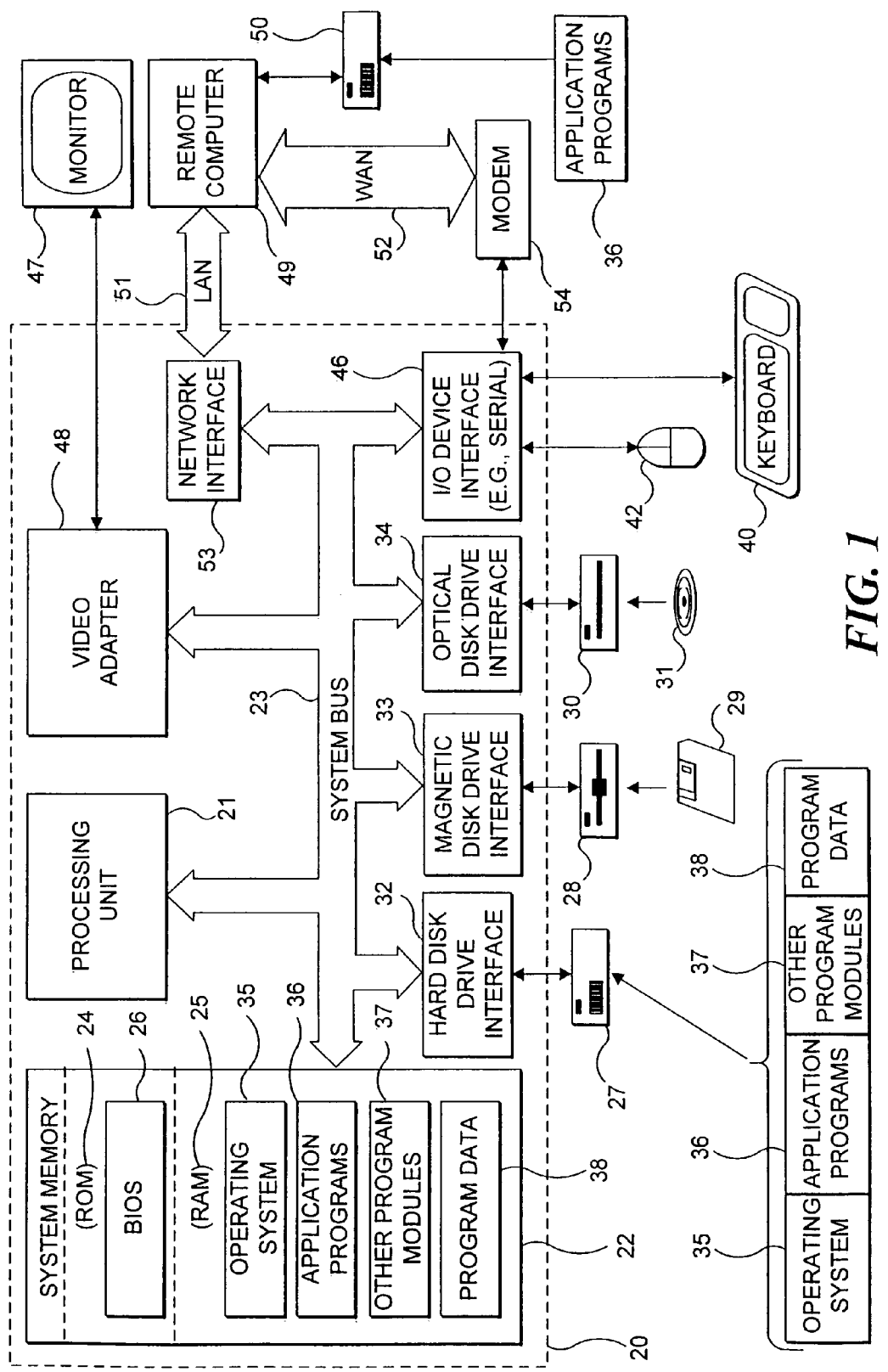
FIG. 1 is a functional block diagram of a generally conventional personal computer that is suitable for use in implementing the present invention.

FIG. 1 and the following discussion related thereto are intended to provide a brief, general description of a suitable computing environment in which the present invention may be implemented. This invention is preferably practiced using one or more computing devices. If multiple computing devices are employed, they may be coupled to each other by a communications network, and one of the computing devices may be designated as a client and the other as a server. For example, the server may include storage on which are stored the image files to be compressed. Both the server and the client computing devices will typically include the functional components shown in FIG. 1. Although not required, the present invention is described as employing computer executable instructions, such as program modules that are executed by a processing device. Generally, program modules include application programs, routines, objects, components, functions, data structures, etc. that perform particular tasks or implement particular abstract data types. Also, those skilled in the art will appreciate that this invention may be practiced with other computer system configurations, including handheld devices, pocket personal computing devices, digital cell phones adapted to execute application programs and to wirelessly connect to a network, other microprocessor-based or programmable consumer electronic devices, multiprocessor systems, network personal computers, minicomputers, mainframe computers, and the like. As indicated, the present invention may also be practiced in distributed computing environments, where tasks are performed by one or more servers in communication with remote processing devices that are linked through a communications network. In a distributed computing environment, program modules may be located in both local and remote memory storage devices.

With reference to FIG. 1, an exemplary system for implementing the present invention includes a general purpose computing device in the form of a personal computer 20 that is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that are employed to transfer information between elements within computer 20, such as during start up, is stored in ROM 24. Personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, the image files, and other data for personal computer 20. Although the exemplary environment described herein employs a hard disk, removable magnetic disk 29, and removable optical disk 31, it will be appreciated by those skilled in the art that other types of computer readable media, which can store the images files and other data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, or in ROM 24 or RAM 25, including an operating system 35, one or more application programs 36, other program modules 37, and program data 38. A user may enter commands and information into personal computer 20 through input devices such as a keyboard 40, graphics pad, and a pointing device 42. Other input devices (not shown) may include a microphone, joystick, game pad, satellite dish, scanner, or the like. These and other input/output (I/O) devices are often connected to processing unit 21 through an I/O interface 46 that is coupled to system bus 23. The term I/O interface is intended to encompass interfaces specifically used for a serial port, a parallel port, a game port, a keyboard port, and/or a universal serial bus (USB), and other types of data ports. A monitor 47, or other type of display device, is also connected to system bus 23 via an appropriate interface, such as a video adapter 48, and is usable to display application programs, Web pages, the original and decompressed image files, and/or other information. In addition to the monitor, the server may be coupled to other peripheral output devices (not shown), such as speakers (through a sound card or other audio interface, not separately shown), and printers.

As indicated above, the present invention can readily be practiced on a single computing device; however, personal computer 20 might also operate in a networked environment using logical connections to one or more remote computers, such as a remote computer 49, which may be a client computer exchanging data over the network. Remote computer 49 may alternatively be a server, a router, a network PC, a peer device, or a satellite or other common network node, and typically includes many or all of the elements described above in connection with personal computer 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, personal computer 20 is connected to LAN 51 through a network interface or adapter 53. When used in a WAN networking environment, personal computer 20 typically includes a modem 54, or other means such as a cable modem, Digital Subscriber Line (DSL) interface, or an Integrated Service Digital Network (ISDN) interface, for establishing communications over WAN 52, which may be a private network or the Internet. Modem 54, which may be internal or external, is connected to the system bus 23 or coupled to the bus via I/O device interface 46; i.e., through a serial port. In a networked environment, image files, data, and program modules depicted relative to personal computer 20, or portions thereof, may be stored in the remote memory storage device. It will be appreciated that the network connections shown are exemplary and other means of establishing a communications link between the computers may be used, such as wireless communication and wideband network links.

Exemplary Application of the Present Invention

While it again should be emphasized that the present invention is not in anyway limited to compressing image files to fit within the available storage space on a floppy disk or other storage medium, the present invention was specifically developed for such an application. Clearly, however, the ability to automatically select a compression quality or compression size for files to meet some specified limit is applicable to other applications. For example, it will be useful for compressing image files in a set to a compressed size that is acceptable for use in an attachment to an email message. The present invention will enable a user to efficiently compress the image files, while maintaining an acceptable quality of the image files when decompressed. Thus, the attachment comprising the set of compressed image files can be made sufficiently small in size to ensure that the email and attachment are efficiently transmitted to a recipient over a relatively slow network connection.

The only requirement for use of the present invention is that a file be compressible using a lossy compression scheme in which a parameter such as a compression quality level is used to set the degree of compression. Since an initial application of the present invention was for use in selecting the degree of compression of a set of image files so that once compressed, the compressed image files would all fit within the available storage of a floppy disk, a preferred embodiment for implementing that application is disclosed below.

Figure 2:
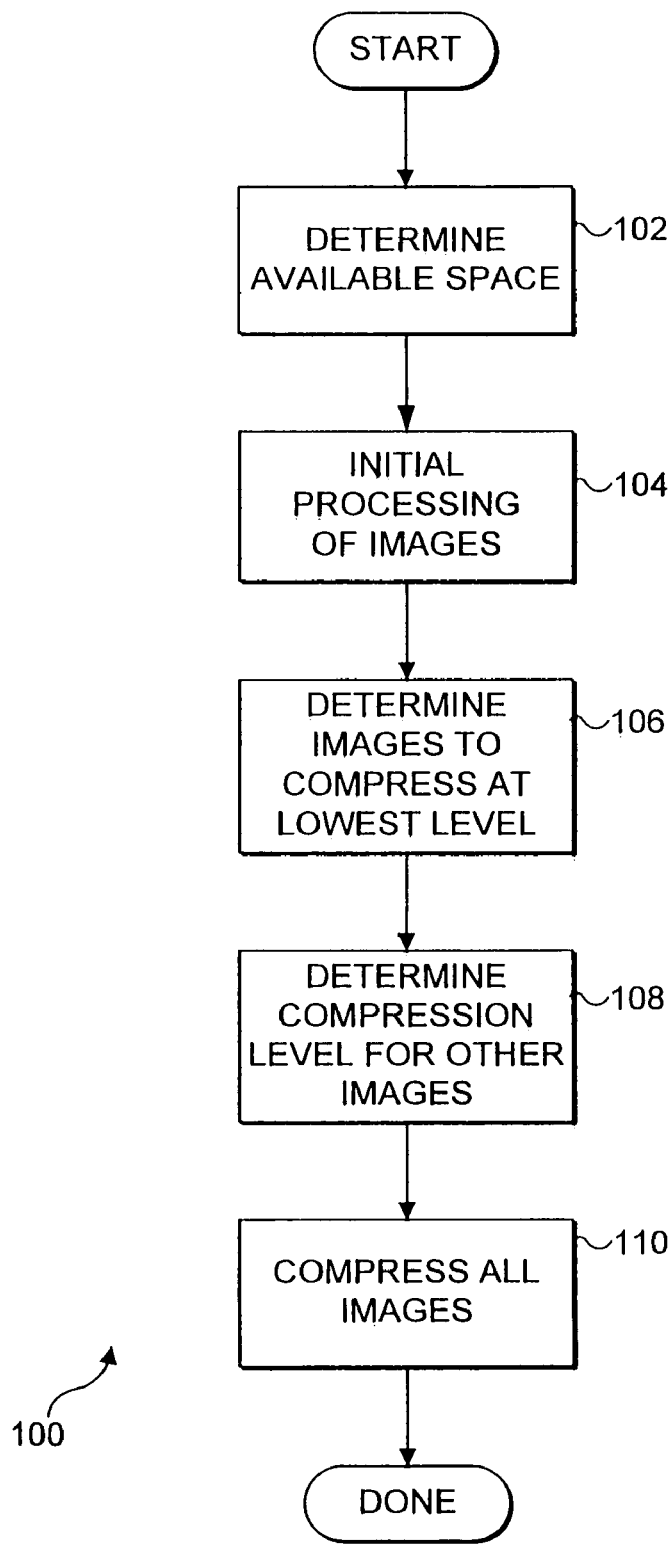
FIG. 2 is a high level flow chart showing the main steps implemented in practicing the present invention when determining a quality level to be applied in compressing each of a set of image files so that the resulting compressed files will fit within an available storage space.

With reference to FIG. 2, a flow chart 100 illustrates the broad steps that are carried out in practicing the present invention. Beginning with a block 102, a determination is made of the available space in which the compressed image files will be stored. Alternatively, this step might be directed to determining a desired total size for all of the compressed files in the set, or some other desired limit on the total size of the compressed files. Other files besides the compressed image files will likely be stored on a floppy disk, so that the available capacity of the floppy disk for storing these compressed files will be less than the original 1.44 MB. However, it is equally possible that the image files might be stored on either a larger storage medium. In this exemplary preferred embodiment, it is generally assumed that less than all of the storage of a floppy disk is available for storing up to 40 compressed image files, so that the image files can subsequently be read from the floppy disk when it is inserted into an appropriate floppy drive. For example, in the proposed application, the floppy drive is included in an image viewing product that is coupled to a standard television for display of the image files on the television screen after the compressed files on the floppy disk are decompressed. To implement this application, it is necessary to store other files on the floppy disk. It is also possible that the floppy disk or other storage medium might simply be used for storing the compressed image files until such time that the user chooses to display them on the PC monitor or other display. To display the compressed image files, they must first be decompressed.

Alternatively, the image files might be compressed for inclusion as an attachment to an email message, in which case the total desired size of the compressed files (and the number of image files in the set being compressed) may be smaller. Block 102 simply indicates that the parameter specifying the total size of the compressed images files must initially be known or determined.

In a block 104, initial processing of the image files in the set is carried out. Details of the steps implemented for this and each of the other blocks shown in FIG. 2 are discussed below. A block 106 determines the images that will be compressed to the lowest quality level (maximum acceptable extent of compression). It is generally known by those of ordinary skill in the art that for a particular type of lossy compression, such as the JPEG system, there is an acceptable or desirable range of image quality level that is applicable to compressing images so that the images, when subsequently viewed on a display after being decompressed, retain an acceptable level of quality. As discussed above, the quality of an image is likely to be more adversely affected when compressed at a given quality level, if the image is more complex than if the image is relatively low in complexity, with little detail. One measure of complexity or detail in an image is its high frequency energy. Images that have little high frequency energy and are thus of low complexity can readily be compressed at a predefined minimum acceptable quality level (i.e., using the greatest acceptable compression) within the acceptable range, without experiencing an unacceptable loss of detail when decompressed for viewing. Thus, the steps carried out in block 106 simply identify those images that can be compressed to this predefined lowest acceptable quality level and maximum compression.

If JPEG compression is used, as is true in this preferred embodiment, it is generally agreed that an acceptable range of the quality level that might be used for compressing image files is between about 5 and about 95 (on a scale from 0 to 100). As a result, the steps carried out in block 106 identify those image files that can be compressed using the JPEG compression scheme at a quality level of 5. However, it will be understood that a different minimum acceptable quality level and a different range of quality level can instead be employed in the present invention, depending upon the preferences of a user and the type of compression scheme employed to compress the image files.

A block 108 provides for determining the compression level that should be applied to all of the other image files to ensure that the total storage required for the compressed image files of the set does not exceed the available space determined in block 102. Clearly, in this block, it is preferable to determine the optimal quality level to apply in compressing the other image files within the range from the predefined minimum acceptable quality level to the highest quality level within the range noted above. Finally, in a block 110, all of the image files are compressed at the quality level that was determined, including the image files that were identified as suitable to be compressed at the predefined minimum acceptable quality level, and those for which a specific quality level was determined in block 108. The result is a set of compressed image files that are no greater than the available storage space or predefined limit for the total size of the compressed files that was determined in block 102.

Figure 3:
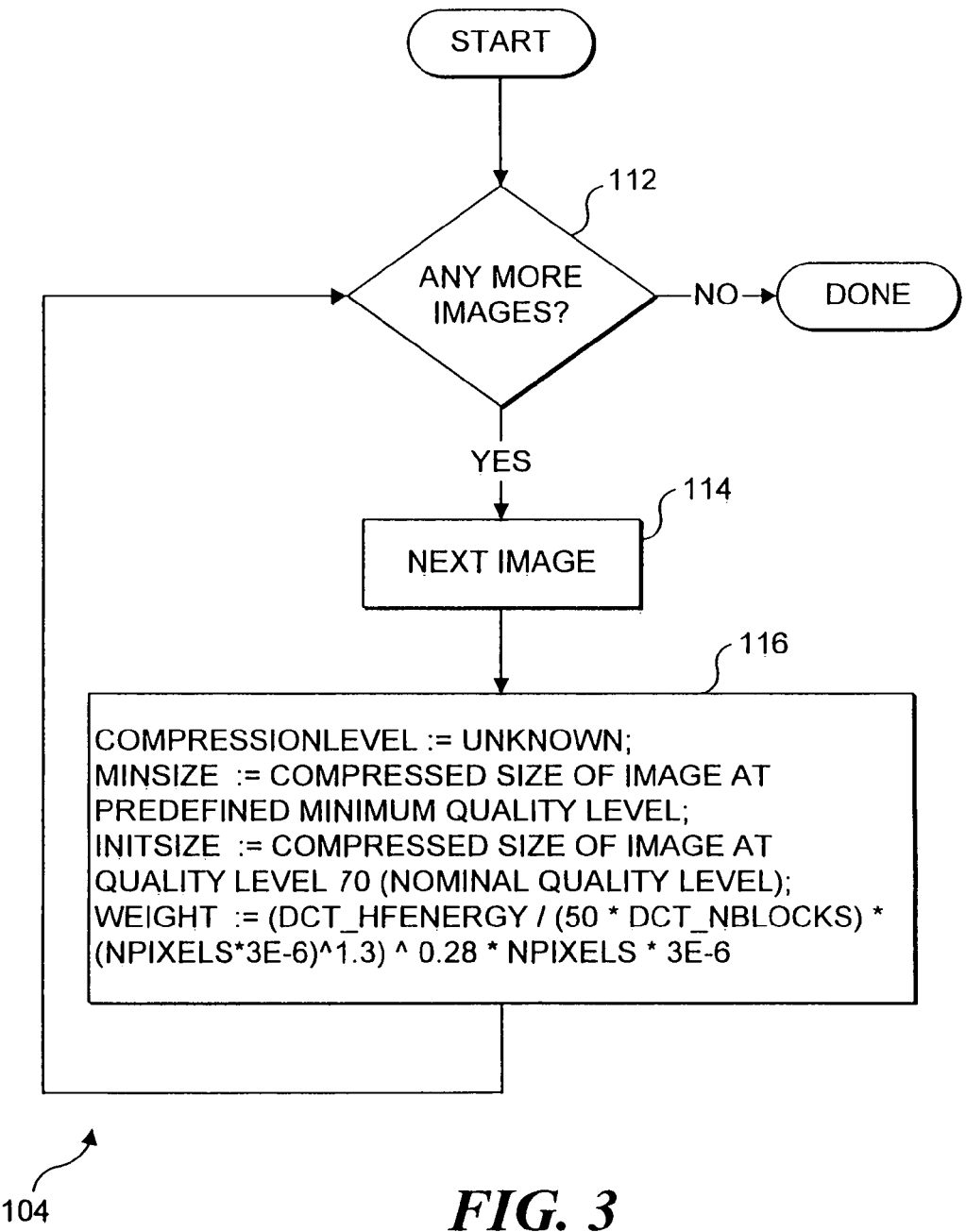
FIG. 3 is a more detailed flow chart showing the steps employed in the initial processing of image files.

Turning to FIG. 3, details of the steps implemented in block 104 are illustrated. Beginning with a decision step 112, the method determines if any more image files remain to be processed, since this procedure loops through all of the image files in the set. If so, a step 114 provides for processing the next image file in the set. Thereafter, in a step 116, the initial processing steps are applied to the current image file from the set. In step 116, a variable referred to as compressionlevel is initialized to "unknown." Next, the minimum size of the current image file, which is identified by the variable minsize is set equal to the compressed size of the current image file when compressed at the predefined minimum quality level (e.g., a JPEG quality level of 5). Within the acceptable range, a nominal quality level is 70. Accordingly, a variable initsize is set equal to the size of the compressed image file resulting from compressing the current image file at a quality level of 70. Finally, a variable weight is computed for the current image file, based upon the following equation:

$$\text{weight} = \left[\frac{\text{DCT\_hfEnergy}}{50 * \text{DCT\_nblocks}} * (nPixels * 3E - 6)^{1.3}\right]^{0.28} * (nPixels * 3E - 6)$$

The above equation used for computing weight for an image file as a function of the high frequency energy (DCT_hEnergy) of the image was empirically determined. The high frequency energy is indicative of the complexity of the image and is a characteristic of a particular image that is indicative of how much compression can be applied without incurring an unacceptable loss of detail. The equation shown above is just one exemplary choice and was designed to increase the weight of an image file as its high frequency energy content increases and as a nonlinear function of the number of pixels (nPixels) in the image. Clearly, image files with more pixels (i.e., higher resolution) will require more bytes to be included in the compressed file to achieve the same quality when decompressed, compared to an image file having fewer pixels. One interesting aspect of the present invention is the realization that these two relationships must be nonlinear for a constant perceived image quality to be achieved for different compressed image files when subsequently decompressed and displayed.

The above equation is better suited to images having equal numbers of pixels, but nevertheless, enables image files to be of different size prior to compression. In the above equation, the term DCT_hEnergy refers to information pertaining to the high frequency energy content that is gathered during a discrete cosine transform, which is carried out as part of the JPEG compression algorithm applied to each image file. Similarly, DCT_nblocks is information relating to the number of blocks, which is also determined during the discrete cosine transform.

In a preferred embodiment, the high-frequency energy is computed by the following equation:

$$DCT\_hfEnergy = \sum_{block=1}^{DCT\_nblocks} \sqrt{\sum_{i=N1}^{N2} \sum_{j=N1}^{N2} |DCT_{block}(i,j)|^2}$$

In the above equation, the parameters N1 and N2 determine the range of DCT frequencies whose energies should be accounted for. DC components should not be included in this computation, and thus N1>0. In a typical implementation, N1=4 and N2=7. The square root operator computes a root-mean-squared (RMS) energy for each block, and thus, the final value of DCT_hfEnergy is the average of the RMS block energies.

Figure 4:
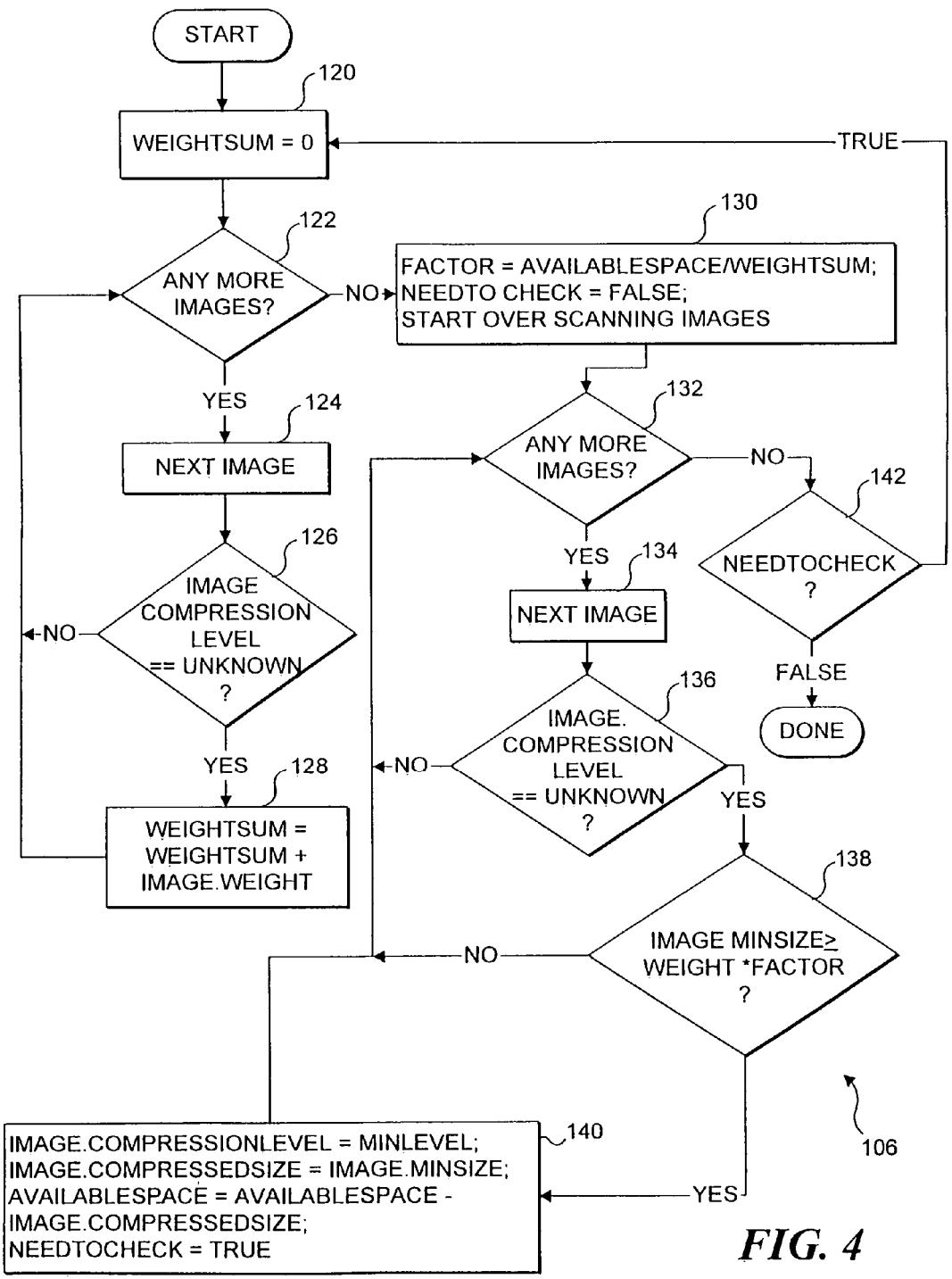
FIG. 4 is a detailed flow chart showing the steps used to identify the image files that will be compressed with the minimum quality level (i.e., to achieve a maximum acceptable compression)

Next, the steps that are implemented to identify any image files that will be compressed to the predefined minimum acceptable quality level in the selected range are illustrated in FIG. 4. This process begins with a step 120 in which a variable weightsum is initialized to zero. A decision step 122 determines if there are any more images to be processed. If so, in a step 124, the next image file in the set is evaluated. A decision block 126 determines if the variable image.compression level is currently "unknown," which will be true for every image file in the initial pass through the procedure illustrated for block 106. If so, in a step 128, the variable weightsum is incremented to include the value of weight for the current image. This step eventually returns a final value for weightsum that is equal to the total weight of all of the images in the set. After each image is evaluated, the logic returns to decision step 122 until no further images are available to be processed. The logic then proceeds to a step 130.

In step 130, a variable factor is set equal to the quotient resulting from dividing the value of the variable availablespace, which is the total space available for storing images, by the last calculated or running value for the total weight of the images (weightsum). In addition, a variable identified as needtocheck is set equal to the Boolean value, false. The image files are then again scanned, leading to a decision step 132, which determines if there are any more images to be processed in the current pass through the image files. If so, a step 134 provides for evaluating the next image file. A decision step 136 then determines if a variable image-.compression level for the current image file being evaluated is "unknown," and if so, proceeds to a decision step 138, which determines if the compressed file size of the current image when compressed at the minimum quality level (a variable image.minsize) is greater than or equal to the product of the weight of the current image and the factor variable. If so, the current image is identified as being one that should be compressed to the predefined minimum quality level, i.e., the variable image.compressionlevel is set equal to minlevel. Accordingly, a step 140 sets the compressed level for the current image equal to the predefined minimum quality level.

In addition, the compressed file size for the current image is set equal to the size of the compressed image file for the current image when it is compressed to the predefined minimum quality level. The availablespace variable is then decremented by the compressed size of the image file (by the value of the variable imaged.compressedsize) when thus compressed to the predefined minimum quality level. Finally, the variable needtocheck is set equal to the Boolean value true.

The significance of setting the needtocheck variable equal to true is to indicate that during the current pass through the set of image files, at least one image file was identified as suitable to be compressed to the predefined minimum quality level. Thereafter, the logic loops back to decision step 132, which determines if there are any more image files to process. Once each of the image files in the set has been processed, the result from decision step 132 leads to a decision step 142. In this decision step, the value of the variable needtocheck is determined. If its Boolean value is equal to false, the last pass through all of the image files failed to identify any further image file that should be compressed to the predefined minimum quality level and step 106 of the overall procedure is completed. However, if the value of the needtocheck variable is true, the logic loops back to step 120, which again initializes the variable weightsum equal to zero. Again, the logic proceeds to decision step 122, looping through step 124, decision step 126, and for those image files that have not been identified as being compressed to the predefined minimum quality level, continuing to step 128, which increments the value of weightsum with the weight of the current image file (which is not to be compressed to the predefined minimum quality level).

Once all of the image files have been processed, the logic proceeds to step 130, with a value for weightsum now equal to the total weight of all of the image files that have not yet been identified as being compressed to the predefined minimum quality level. The logic again proceeds through decision step 132, starting another pass through the set of image files and evaluating each of the image files not yet identified as being suitable to compress to the predefined minimum quality level, with the logic of decision step 138. However, in decision step 138, since the value of factor will be different in the current pass, it is possible that one or more additional image files will be identified as suitable to compress to the predefined minimum quality level. Thus, the steps implemented in FIG. 4 are reiterated until no further image files is identified to be compressed to the minimum quality level within a current pass through the set of image files, as determined in decision step 142.

Figure 5:
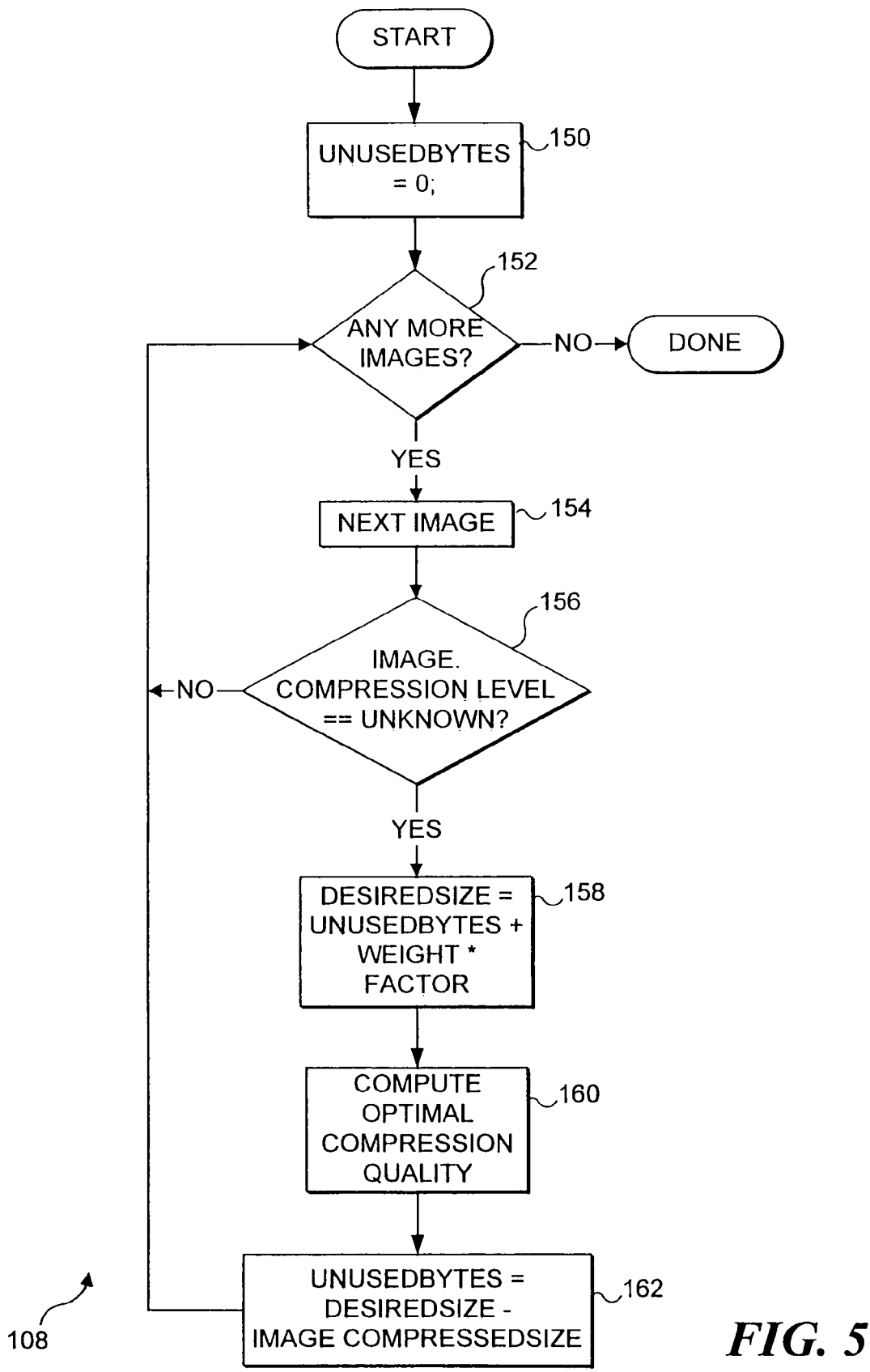
FIG. 5 is a flow chart showing the steps applied in determining the quality level applied to all of the other image files (i.e., those not to be compressed to the minimum quality level)

In FIG. 5, details of block 108 are illustrated. In a step 150, a variable identified as unusedbytes is initialized to zero. A decision step 152 determines if any more image files remain to be processed and if so, the logic proceeds to a step 154 to enable processing of the next image file. A decision step 156 determines whether the compression level (or quality level) for the current image file being processed is still unknown. If so, which will initially be true of all of the remaining image files that are not identified as suitable for compression at the predefined minimum quality level, the procedure continues with a step 158. In this step, a variable desiredsize is set equal to the sum of the variable unusedbytes and the product of the weight of the current image and the variable factor. It will be recalled, that factor was determined on the last pass through the image files in the logical steps illustrated in FIG. 4, at step 106. Accordingly, the value of factor corresponds to that related to the last determination of available space and the last computed total of all of the weights of the image files not previously identified as being suitable for compression to the predefined minimum quality level. The variable desiredsize is thus determined for each image file that is not to be compressed to the predefined minimum quality level.

A block 160 provides for computing the optimal compression quality for each such image file. Unlike any image file that is to be compressed to the predefined minimum quality level, each of the remaining image files will preferably be compressed to a quality level that most closely achieves the desiredsize so that the total required storage for all the compressed image files does not exceed the capacity of the available storage or other predefined limit. Thus, block 160 involves a substantial number of steps, which are disclosed below in connection with FIGS. 6A, 6B, and 6C. After the optimal compression quality level is determined for the current image file, the logic proceeds to a step 162 which determines a value for the variable unusedbytes as equal to the difference between the value of desiredsize and the actual compressed size of the image (image.compressedsize) when compressed to the optimal compression quality level determined in the proceeding step. Thus, the variable unusedbytes corresponds to the leftover storage from the current image file that was processed in block 160, since a specific optimal quality level will often result in a compressed file size that is slightly less than the value of desiredsize. Thereafter, the logic loops back to decision step 152 to determine if any more image files need to be processed. If not, the logic is done, enabling the procedure to return to block 110, in FIG. 2.

As an alternative to employing the space remaining after determining the optimal compression quality for the previous image file in determining the desired size for the next image file (step 158), it is also contemplated that the value of the variable unsuedbytes could be accumulated over all of the image files, and then distributed among the image files that were compressed to a size less than the desired size by some predefined limit. For example, the unused space could be distributed to the image files that were compressed to a size that was closer to 90% of the desired size than to those that were compressed to a size that was closer to 100% of the desired size. This pass would then adjust the optimal quality level a little higher for the image files that were initially compressed more than desired.

Figure 6A:
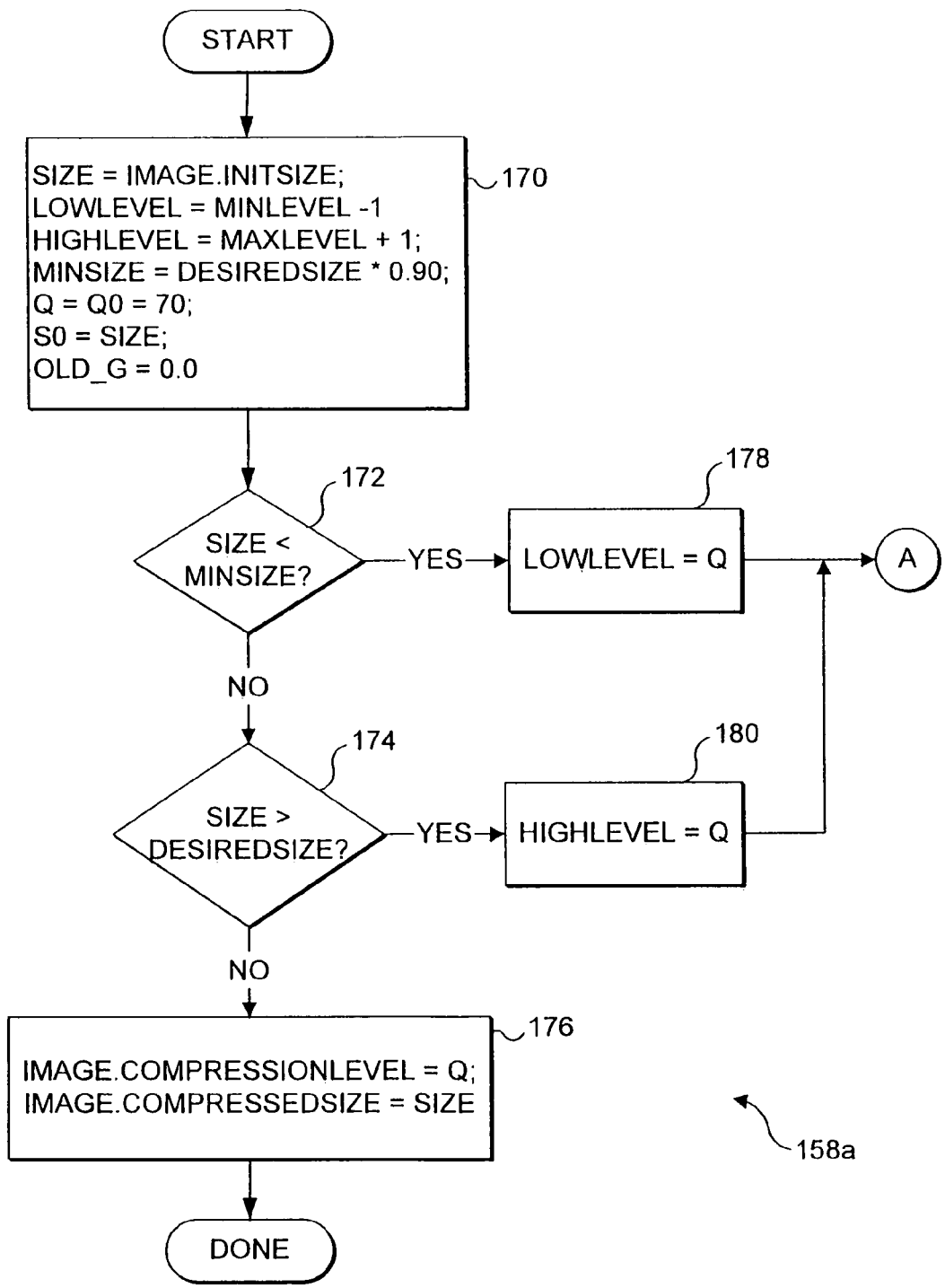
FIGS. 6A, 6B, and 6C together illustrate a flow chart showing the detailed steps applied in determining an optimal quality level for each image that is not to be compressed to the minimum quality level.
Figure 6B:
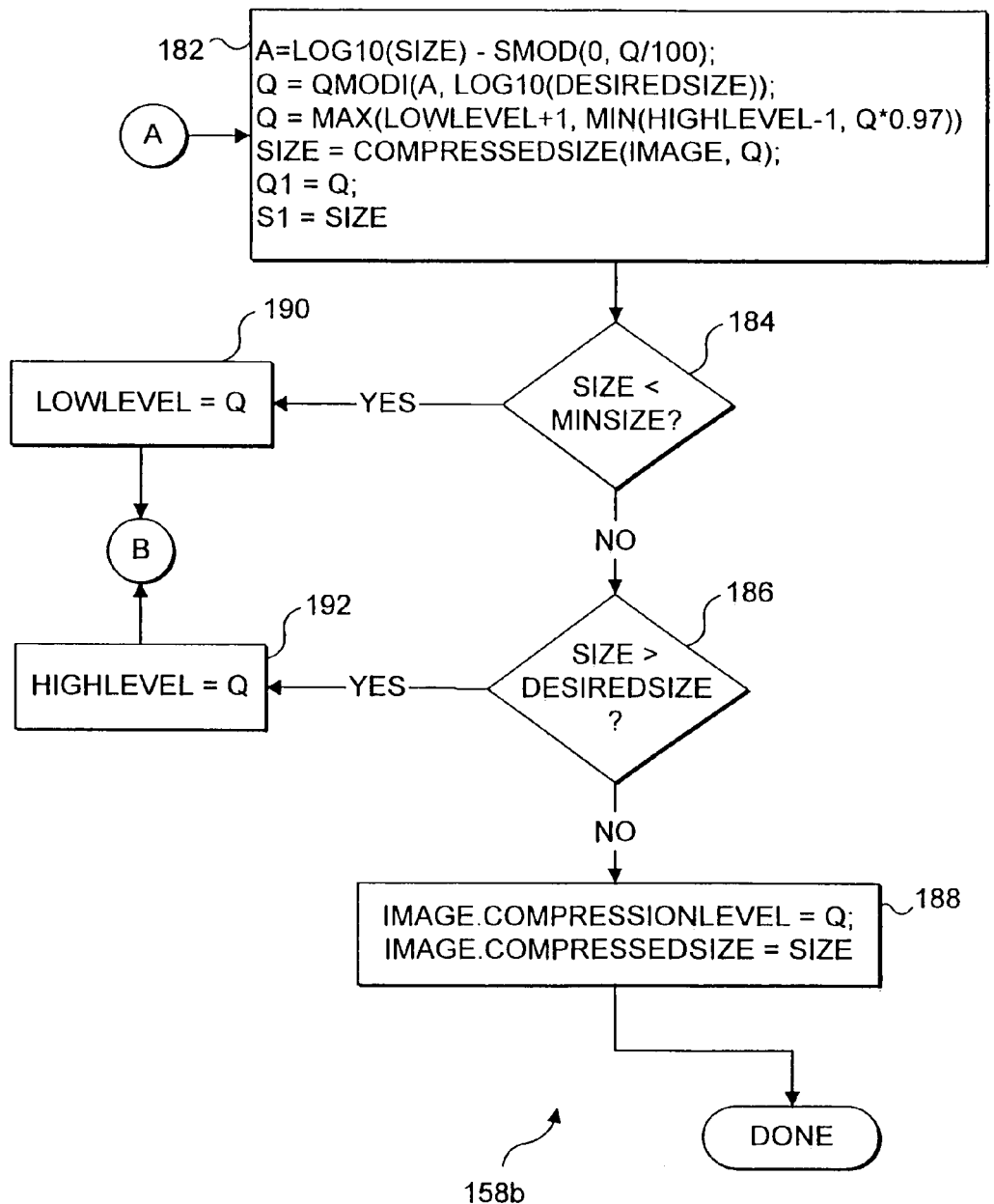
Figure 6C:
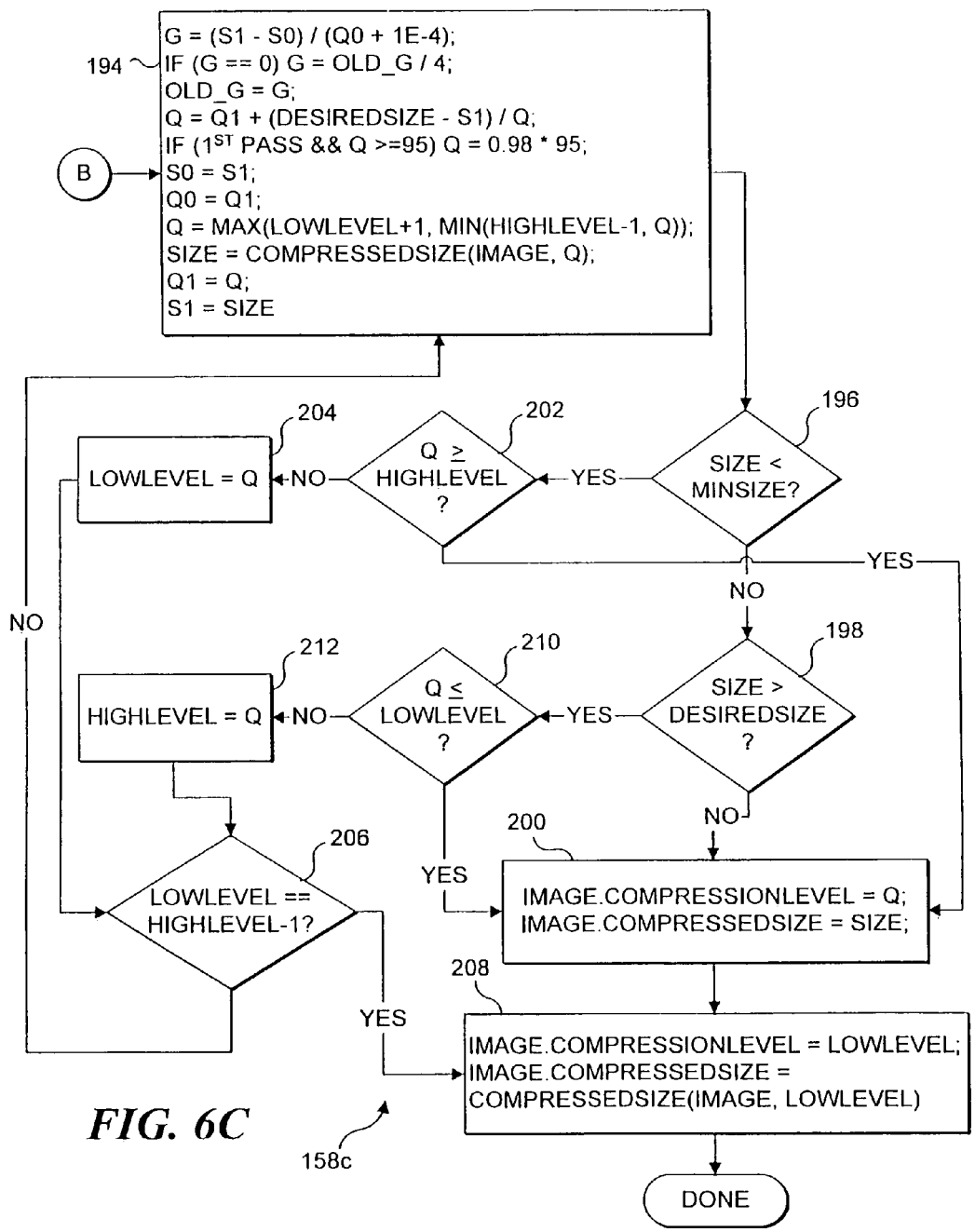

As noted above, the procedure followed to determine the optimal quality level used in compressing image files in this exemplary application of the present invention is somewhat complex. The logical steps employed are shown in three flow chart sections 158a, 158b, and 158c, which are shown in FIGS. 6A, 6B, and 6C, respectively. Tags identified "A", "B", and "C" in these three Figures indicate the point of logical connection between the steps illustrated in the Figures. One or more passes are made for each image file that is processed, to determine its optimal quality level. A first pass is made through the steps in FIG. 6A. It the first pass does not identify the optimal quality level, the image file is processed according to the steps of FIG. 6B. If necessary, remaining passes are carried out in accord with the logic of FIG. 6C to determine the optimal quality level for the image file.

Referring first to FIG. 6A, a step 170 provides for initializing several variables used in the procedure. Specifically, a variable size is set equal to the variable image.initsize, which is the size of the current image file when compressed at the nominal quality level (e.g., a quality level equal to 70), for those image files that are not identified as suitable to be compressed to the predefined minimum quality level. It should be noted that the procedure shown in FIGS. 6A, 6B, and 6C is carried out for a current image file to determine the optimal compression quality level that will be applied to it when it is compressed. Thus, the steps shown in these three figures are applied to each of the image files that have not been identified as suitable to be compressed at the predefined minimum quality level. In step 170, a variable lowlevel is set equal to the predefined minimum acceptable quality level (represented by the variable minlevel) minus one. As noted above, if JPEG compression is used, this preferred embodiment uses a quality level 5 as the predefined minimum quality level, so that the variable lowlevel would be set equal to 4. Similarly, a variable highlevel is set equal to the maximum quality level (represented by the variable maxlevel) plus one so that for JPEG compression and using the accepted range that extends from 5 to 95, the value of highlevel would be equal to 96. A minsize variable is set equal to the product of the variable desiredsize and 0.90, where the value of the variable desiredsize was previously calculated as noted above. Variables Q and Q0 are both set equal to 70, corresponding to the nominal quality level, a variable S0 is set equal to size to provide temporary storage for the variable size, and a variable OLD_G is set equal to 0.0.

A decision step 172 provides for determining if the variable size is less than the variable minsize (which at this point is equal to nine-tenths of the value of the variable desiredsize). If so, the size of the current image file is not within ten percent of the value of the variable desiredsize. However, if the result from decision step 172 is negative, a decision step 174 determines if the variable size is greater than the value of desiredsize. If not, the actual size of the compressed file when compressed to the nominal quality level is within ten percent of the desiredsize and as a result, in a step 176, the image.compressionlevel or quality level is set equal to the current level of Q, which is 70. Similarly, the image.compressedsize is equal to the current value of size, which is the size of the drawing file when compressed to the nominal quality level 70. At this point, the optimal quality level is determined for the current image file and the procedure is complete, causing the logic to return to step 162 in FIG. 5.

If the response to decision step 172 in FIG. 6A is positive, a step 178 provides for setting a variable lowlevel equal to the value Q (currently equal to quality level 70). Similarly, if the results in decision step 174 are affirmative, a variable highlevel is set equal to the variable Q (currently equal to a quality level of 70) in a step 180. Following either step 178 or 180 the logic proceeds to a step 182 in FIG. 6B.

The purpose of the loops shown in FIGS. 6B and 6C is to reiteratively adjust the quality level applied in compressing the image files until the optimal quality level is determined. To accomplish this goal, the variable Q is adjusted up or down according to the results of the previous pass through the logic in these two FIGS. (6A and 6B), to produce a compressed file size that is neither too large (i.e., greater than the value of desiredsize), nor too small (less than 90% of desiredsize). Before Q is adjusted on a subsequent pass through these loops, an interval ranging between the variable lowlevel and the variable highlevel is reduced to minimize the number of iterations required to determine the optimal quality level. The iterative process is terminated when either the size of the compressed file achieved with a current quality level is outside the desired range defined by the variables minsize and desiredsize, and the quality level Q is outside the interval between lowlevel and highlevel, OR, when the interval defined by lowlevel and highlevel shrinks to a step of only one, since at that point there is no need to continue to adjust the quality level, because the size will then be as close to the desiredsize as can be achieved.

In step 182, a first value for the quality level Q is computed based on its first value determined in step 170, the first compressed size, and the desiredsize. The computation is specified by the following equations:

$$A = \log_{10}(\text{size}) - s\text{mod}(0, Q/100)$$

$$Q = q\text{mod}i(A, \log_{10}(\text{desiredsize}))$$

where the nonlinear functions smod( ) and qmodi( ) are defined by:

$$s\text{mod}(a,q) = a + b(e^{(q-0.5)^3 + c(q-0.5)} - 1)$$

and where b and c are parameters typically set as b=4.2 and c=0.1, and further where:

$$q\text{mod}i(a,s) = 0.5 + \text{root3}(c, -\log_{10}(1 + |s-a|/b))$$

In the preceding equation, the parameters b and c are the same as before, and the function root3(q,r) returns a solution x to the equation $x^3 + qx - r = 0$. The purpose of the equations above is to provide a first estimate of the quality level Q that should be used to achieve the desired compressed file size. The nonlinear functions were derived from fitting nonlinear models to size versus quality curves for a database of images.

The variable Q is then again defined as a function of the maximum of the sum of lowlevel plus one and (the minimum of highlevel minus one and Q times 0.97). The variable size is then redefined as the compressed size of the image when compressed to the quality level Q that was just determined (referenced by the variable compressedsize(image, Q). A variable Q1 is set equal to the current value for the quality level Q, and a variable S1 is set equal to the current value of size determined above in step 182.

A decision step 184 determines if the current value of size is less than the variable minsize and if not, a decision step 186 determines if the current value of size is greater than the desiredsize for the image file. If not, a step 188 sets the compression level for the current image (image.compressionlevel) equal to the current value for the quality level Q, and sets the variable image.compressedsize equal to the current value of the variable size. At this point, the optimal quality level for compressing the current image file is determined and the logic again would return to next step in FIG. 5, i.e., to step 162.

If the result in decision step 184 is affirmative, indicating that the current value of size is less than the variable minsize, the logic proceeds to a step 190, which sets the variable lowlevel equal to the current quality level, Q. Similarly, if the result in decision step 186 indicates that the current value of the variable size is greater than the desiredsize, a step 192 sets the variable highlevel equal to the current quality level, Q. After either step 190 or 192, the logic proceeds via connector B to a step 194 in FIG. 6C.

Referring to FIG. 6C, step 194 defines a new value for the quality level. Initially in step 194, a variable G is defined as a function of the variables S1, S0, and Q0. If G is found to be identical to zero, G is redefined as one-fourth the variable, OLD_G. Next, the variable OLD_G is set equal to the value of the variable G. Q is then redefined as the sum of Q1 and the quotient of the difference between desiredsize and S1 when divided by the variable Q. An IF clause provides that if this pass is the first through step 194 and if Q is greater than or equal to 95 (the maximum acceptable quality level), then Q is redefined as being equal to the product of 0.98 and 95. Otherwise, Q is not redefined by this IF clause. The variable S0 is set equal to the variable S1, the variable Q0 is set equal to the variable Q1, and Q is redefined as being equal to the maximum of the variable lowlevel plus one and (the minimum of highlevel minus one and the current value of Q). The variable size is then recomputed by compressing the image file to the now defined value of the quality level, Q. Q1 is set equal to the value of Q, and the variable S1 retains the current value of the variable size. The logic then proceeds to a decision step 196.

Decision step 196 determines if the current value of the variable size is less than the current value of minsize and if not, the logic proceeds to a decision step 198, which determines if the current value of the variable size is greater than the variable desiredsize. If not, a step 200 sets the compression level for the current image (image.compresionlevel) equal to the current value of the variable Q, and the compressed size of the current image (image.compressedsize) equal to the current value of the variable size. This procedure is then concluded for the current image file, again causing the logic to return to step 162 in FIG. 5.

If decision step 196 returns an affirmative response, a decision step 202 determines if the current value of Q is greater than or equal to the variable highlevel. If so, the logic proceeds again to step 200, so that the current value of the quality level Q and the current value of the variable size can be recorded for the current image. Essentially, decision steps 196 and 202 will have at this point determined that the compressed size of the image file for the quality level that is currently being considered, Q, makes the image file too small, since it is less than the variable minsize, but also, the quality level is above the highest quality level desired (the variable highlevel), so there is no point in proceeding any further in the iteration. If the result in decision step 202 is negative, the logic proceeds to a step 204, which sets the variable lowlevel equal to the current variable Q. The logic then proceeds to a decision step 206, which determines if the variable lowlevel is equal to the value of the variable highlevel minus one and if so, proceeds to a step 208, which sets the quality level or compression level for the image file currently being evaluated equal to the variable lowlevel and determines the actual size of the compressed image file (image.compressedsize) when compressed to the quality level corresponding to the variable lowlevel. Following step 208, the logic again is concluded for this part of the process and return to step 162 in FIG. 5.

Referring back to FIG. 6C, if the result in decision step 198 is affirmative, the logic continues with a decision step 210 that determines if the current value of Q is less than or equal to the variable lowlevel. If so, the logic again proceeds to step 200, however, if not, the logic continues with a step 212 in which the variable highlevel is set equal to the current value of the quality level Q. Following step 212, the logic again proceeds with decision step 206. If the response to the decision step 206 is negative, the logic returns to step 194. In regard to decision steps 198 and 210, an affirmative response to each indicates that the current value of Q provides a compressed file that is greater in size than desired, but since Q is already less than the lowest quality level deemed acceptable, there is no reason to try to make Q any lower, and thus, the logic terminates. The optimum quality level then uses the current value of Q in step 200. While it may appear that having a compressed file that is greater than the desiredsize would cause a problem, the next image file will simply need to be compressed to a slightly smaller size than would otherwise have been desired. It might be noted that, if the current image file being evaluated to determine its optimal quality level is the last in the set of image files, a problem might occur. In fact, this problem does not arise, because the files that are suitable to be compressed to the predefined minimum acceptable quality level have already been determined in the procedure illustrated in FIG. 4.

Once each of the image files that are not to be compressed to the predefined minimum acceptable quality level have been processed to determine their optimal quality level for compression, all of the image files are then compressed to the quality level that was determined to be appropriate for them. As a result, the total size of all of the compressed image files should be less than the storage capacity or less than the predetermined limit that was previously defined and, given that requirement, the quality of the files when decompressed and displayed will be near the optimal that could be expected.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method comprising:
    determining an optimal compression quality levels for each respective image file in a set of image files, wherein when compressed to the optimal compression quality levels to produce a compressed set of image files, a total size of the compressed set of image files is substantially equal to or below an amount of available storage, where the determining is performed by steps comprising:
    selecting an image file from the set of image files;
    automatically specifying an initial quality level for the image file as a current quality level;
    setting a size value of the image file to a compressed size value of the image, that the image file would have lf the image file were compressed with the current quality level; and
    given a desired size that is based on a current unused amount of the available storage, determining f the size value of the image file is within a range defined by a minimum acceptable size and the desired size;
    if the size value is within the range, setting the optimal compression quality level of the image file to the current quality level and reducing the current unused amount of available storage according to the size value of the image file;
    if the size value of the image file is not within the range, then adjusting the current quality level and repeating the setting and determining until the optimal compression quality level of the image file has been set; and
    repeating the steps above for each of the remaining image files in the set.

2. The method of claim 1, further comprising the step of determining a minimum acceptable quality level for the image file.

3. The method of claim 1, further comprising the step of determining a maximum acceptable quality level for the image file.

4. The method of claim 1, further comprising the step of setting one of the minimum acceptable quality level and the maximum acceptable quality level equal to the current quality level, fit is determined that the size value of the image file is not within the range.

5. The method of claim 1, wherein the step of adjusting the current quality level comprises the step of adjusting the current quality level as a function of the current quality level, the size value and the desired size.

6. The method of claim 5, wherein the step of adjusting the current quality level further comprises the step of further adjusting the current quality level as a function of the minimum acceptable quality level and the maximum acceptable quality level.

7. The method of claim 1, wherein the compression quality level of the image file has been optimized according to predefined criteria f the size value of the image file is less than the minimum acceptable size and the current quality level of the image file is greater than or equal to a maximum acceptable quality level.

8. The method of claim 1, wherein the compression quality level of the image file has been optimized according to predefined criteria f the size value of the image file is greater than or equal to a minimum acceptable size, and the size value of the image file is greater than the desired size and the current quality level is less than or equal to the minimum acceptable quality level.

9. The method of claim 1, wherein the compression quality level of the image file has been optimized according to predefined criteria f the size value of the image file is less than the minimum acceptable size, and the current quality level of the image file is not greater than or equal to a maximum acceptable quality level, and a minimum acceptable quality level is equal to the sum of the maximum acceptable quality level and a predefined value.

10. The method of claim 9, wherein the minimum acceptable quality level is set equal to the current quality level.

11. The method of claim 1, wherein the compression quality level of the image file has been optimized according to the predefined criteria, if:
    (a) the size value of the image file is greater than or equal to the minimum acceptable size;
    (b) the size value of the image file is greater than the desired size;
    (c) the current quality level is greater than the minimum acceptable quality level; and
    (d) the current quality level of the image file is equal to the sum of the minimum acceptable quality level and a predefined value.

12. The method of claim 11, wherein if the compression quality level has been optimized, further comprising the step of setting an optimized size of the image file equal to a compressed size that is determined as a function of the minimum acceptable quality level.

13. The method of claim 1, wherein if the compression quality level of the image file has been optimized, further comprising the step of setting an optimized size of the image file equal to the size value.

14. The method of claim 1, wherein the desired size is a function of the available storage, a weight of the image file, and a factor relating to the available storage and a total of all of the weights of the set of image files.

15. The method of claim 14, wherein the weight of the image file is based upon a high frequency energy content of the image file.

16. The method of claim 1, wherein the minimum acceptable size is a function of a percentage of the desired size.

17. A memory medium having processor executable machine instructions for performing the steps of claim 1.

18. A system for determining optimal compression quality levels for each respective image file in a set of image files, wherein when compressed to the optimal compression quality levels to produce a compressed set of image files, a total size of the compressed set of image files is substantially equal to or below an amount of available storage, the system comprising:
    a memory and/or storage media in which are stored a plurality of machine instructions and the set of image files; and a processor that is coupled to the memory, said processor executing the machine instructions, to carry out a plurality of functions, including:

selecting an image file from the set of image files;

automatically specifying an initial quality level for the image file as a current quality level;

setting a size value of the image file to a compressed size of the image file, that the image would have if the image file were compressed with the current quality level; and given a desired size that is based on a current unused amount of the available storage, determining f the size value of the image file is within a range defined by a minimum acceptable size and the desired size;

if the size value is within the range, setting the optimal compression quality level of the image file to the current quality level and reducing the current unused amount of available storage according to the size value of the image file;

if the size value of the image file is not within the range, then adjusting the current quality level and repeating the setting and determining until the optimal compression quality level of the image file has been set; and repeating the functions above for each of the remaining image files in the set.

19. The system of claim 18, wherein the machine instructions further cause the processor to determine a minimum acceptable quality level and a maximum acceptable quality level for the image file.

20. The system of claim 18, wherein the compression quality level of the image file has been optimized if one of the following predefined criteria exists:

(a) the size value of the image file is less than the minimum acceptable size and the current quality level of the image file is greater than or equal to the maximum acceptable quality level;

(b) the size value of the image file is greater than or equal to the minimum acceptable size, and the size value of the image file is greater than the desired size, and the current quality level is less than or equal to the minimum acceptable quality level;

(c) the size value of the image file is less than the minimum acceptable size, and the current quality level of the image file is less than the maximum acceptable quality level, and the sum of the current quality level and a predefined negative value is now equal to the maximum acceptable quality level; or (d) the size value of the image file is greater than or equal to the minimum acceptable size, and the size value of the image file is greater than the desired size, and the current quality level of the image file is greater than the minimum acceptable quality level, and the sum of the minimum acceptable quality level and a predefined value is equal to the current quality level.

* * * * *